UNITED STATES PATENT OFFICE.

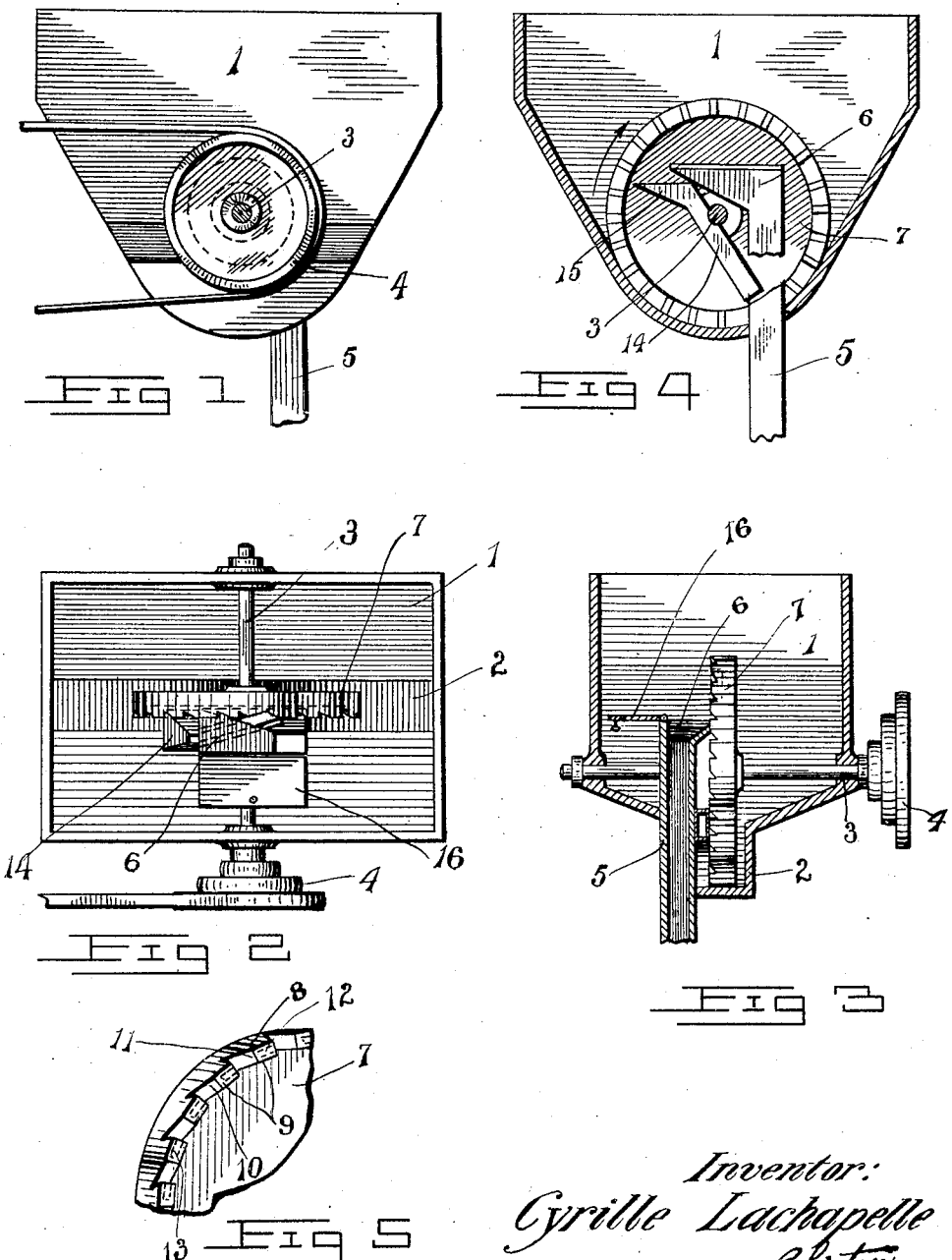

CYRILLE LACHAPELLE, OF ST. PAUL L'ERMITE, QUEBEC, CANADA.

PLANTER.

1,394,097.   Specification of Letters Patent.   Patented Oct. 18, 1921.

Application filed November 5, 1919. Serial No. 335,911.

*To all whom it may concern:*

Be it known that I, CYRILLE LACHAPELLE, a subject of the King of Great Britain, residing at St. Paul l'Ermite, Province of Quebec, Canada, have invented certain new and useful Improvements in Planters; and I do hereby declare that the following is a full, clear, and exact description of the invention, such as will enable others skilled in the art to which it appertains to make and use the same.

The present invention relates to planters and more particularly to a mechanism for distributing the grain.

An object of the present invention is to provide a dropper of this character wherein a uniform amount of grain may be dropped upon the ground at proper intervals.

With the above and other objects in view which will hereinafter appear as the description continues, the invention consists of the novel features of construction, combination and formation of parts as will be hereinafter more fully described and particularly pointed out in the appended claims.

In the accompanying drawings has been shown a simple and preferred form of the invention, it being, however, understood that no limitation is necessarily made to the precise structural details herein exhibited, but the right is hereby reserved to any changes, alterations or modifications to which recourse may be had that come within the scope of the claim without departing from the spirit of the invention or sacrificing the efficiency of the same.

In the accompanying drawings:

Figure 1 is a side elevation of the device embodying the present invention;

Fig. 2 is a plan view of the same.

Fig. 3 is a vertical cross section;

Fig. 4 is a vertical longitudinal section; and,

Fig. 5 is a fragmental perspective view of the feed disk, illustrating in dotted position the cups or pockets.

Referring now more particularly to the accompanying drawings wherein like and corresponding parts are designated by similar reference characters throughout the several views:

The device as herein shown comprises a suitable hopper 1 having a trough 2 in the bottom thereof in which the grain is adapted to accumulate. Journaled within the hopper 1 is a shaft 3 which is connected to a suitable source of power through a cone pulley over which is trained a suitable belt, not illustrated, whereby when the planter is drawn over the field the shaft 3 will be caused to revolve. Extending longitudinally through the hopper 1 is a tube 5 having an enlarged funnel-shaped end 6. The seed from the hopper is adapted to be deposited within this tube 5 so that the grain may be deposited upon the ground.

To cause the grain within the hopper to be deposited within the tube 5 at the proper intervals, I provide a suitable grain lifting and distributing device as will now be described. Keyed to the shaft 3 is a disk 7, and this disk is provided with a flange 8, the marginal edge 9 of which is formed with a plurality of spaced wedge shaped recesses 10, thereby providing relatively long inclined or angular walls 11 and short angular walls 12. The short angularly disposed walls 12 are each formed with pockets or scoops 13. These scoops are adapted to travel within the trough 2 upon the rotation of the disk 7. As the scoops enter the trough they will each scoop up several grains or seeds within the hopper 1 and finally deposit the same within the funnel-shaped end 6 of the tube 5, through which they drop to the ground into a hill or furrow made for their reception by a suitable implement carried by the seeding machine. The scoops 13 are disposed in a plane coaxial with disk 7, as better shown in Fig. 5, so that when they pass through the grain within the hopper 1 they will scoop up several seeds, but when a scoop is full of grain and assumes its uppermost position it will take the grain within the trough 6, as better shown in Fig. 4. These disks are also detachable, so that ones of different size carrying any number of scoops may be secured to the shaft 3 as is desired to have the grain distributed within the tube 5 at proper intervals.

For maintaining the grain at an even level within the hopper 1, to prevent the piling up of the same at one side of the hopper, I provide an auxiliary tube 14 arranged adjacent and disposed at an angle to the tube 5. The tube 14 is provided with an enlarged funnel-shaped upper end 15, while its lower end terminates within the hopper and is spaced from the bottom thereof. The function of funnel 14 is to gather from the pockets or scoops 13 an over accumulation of grain which would be carried by the disk 7 in its upward travel and which would tend to be deposited on one side of the hopper, thereby preventing the accumulation of the grain droppage at that side of the hopper 1, by depositing said over accumulation at the bottom thereof.

It is obvious that I have provided a seeding attachment for planting machine, whereby a predetermined quantity of grains are fed to the main tube 5 and the auxiliary tube 14. A cover or door 16 may be hingedly connected to the funnel-shaped end of the tube 5, which will serve to cut off the grain supply from the disk 7 to the main tube, when the machine is not in planting operation.

Having thus fully described my invention, what I claim as new and desire to secure by Letters Patent is:

A seed feeding attachment for planters comprising a hopper, a shaft journaled within said hopper a feed disk carried by said shaft, said disk formed with a flange having a plurality of wedge shaped recesses arranged therein, pockets formed in said flange and communicating with said recesses, a tube arranged within said hopper and provided with a funnel shaped mouth at its upper end adapted to receive seeds discharged from the pockets of said feed disk, an auxiliary tube also arranged within said hopper adjacent said first tube said auxiliary tube having its upper end formed with a funnel shaped mouth, and its lower end opening within and adjacent the bottom of the hopper, said auxiliary tube being adapted to receive over accumulation of grain carried upwardly by said disk and discharge it at the bottom of said hopper.

In witness whereof I have hereunto set my hand.

CYRILLE LACHAPELLE.

Witnesses:
S. Z. PAQUIN,
H. L. CHARBOUNEAU.